(12) United States Patent
Donovan (10) Patent No.: US 12,312,221 B2
(45) Date of Patent: May 27, 2025

(54) HELICAL BAND ACTUATOR

(71) Applicant: John K. Donovan, Dumfries, VA (US)

(72) Inventor: John K. Donovan, Dumfries, VA (US)

(73) Assignee: Interior Life Productions, LLC, Dumfries, VA (US)

(*) Notice: Subject to any disclaimer, the term of this patent is extended or adjusted under 35 U.S.C. 154(b) by 553 days.

(21) Appl. No.: 17/359,544

(22) Filed: Jun. 26, 2021

(65) Prior Publication Data

US 2021/0378394 A1    Dec. 9, 2021

Related U.S. Application Data

(63) Continuation of application No. 16/004,067, filed on Jun. 8, 2018, now abandoned.

(51) Int. Cl.
| | | |
|---|---|---|
| *B66F 11/00* | (2006.01) | |
| *B25J 9/10* | (2006.01) | |
| *B66F 7/14* | (2006.01) | |

(52) U.S. Cl.
CPC ............... *B66F 11/00* (2013.01); *B66F 7/14* (2013.01); *B25J 9/104* (2013.01); *B66F 2700/04* (2013.01)

(58) Field of Classification Search
None
See application file for complete search history.

(56) References Cited

U.S. PATENT DOCUMENTS

| | | | |
|---|---|---|---|
| 4,875,660 A | 10/1989 | Gagnon et al. | |
| 7,213,796 B2* | 5/2007 | Laforest | B66F 11/00 254/89 R |

* cited by examiner

*Primary Examiner* — Tyrone V Hall, Jr.
(74) *Attorney, Agent, or Firm* — Dickinson Wright, PLLC (57) ABSTRACT

A new and improved helical band actuator (HBA) is provided with a closed conduit upon a radially innermost edge portion of its first elongated fastening band that can accommodate electrical power wiring, as well as fiber optic cables, such that electrical power and computer control data can be transmitted from an electrical power source (EPS) and a central processing unit (CPU) to a powered component supported upon a load-bearing platform being elevated or raised by the new and improved helical band actuator (HBA).

5 Claims, 8 Drawing Sheets

HELICAL BAND ACTUATOR

FIELD OF THE INVENTION

The present invention relates generally to helical band actuators (HBAs), and more particularly, to a new and improved helical band actuator (HBA) that can seamlessly or integrally accommodate electrical power wiring, as well as fiber optic cables, such that electrical power and computer control data can be transmitted to a powered component supported upon the load-bearing platform being elevated or raised by means of the new and improved helical band actuator (HBA).

BACKGROUND OF THE INVENTION

Helical band actuators (HBAs) are linear actuators that are utilized to lift significant loads, such as, for example, stage platforms in a theater or similar environment, or machine platforms. Helical band actuators (HBAs) effectively form high-capacity telescopically extending and contracting tubular columns that can lift significant loads, such as, for example, up to 25,000 pounds, for significant distances of travel/extension/contraction, such as, for example, up to 40 feet, and with extension/retraction ratios of 20:1. Helical band actuators (HBAs) are especially useful when, for example, hydraulic cylinders are unable to be used for any one of a variety of reasons, such as, for example, spatial considerations. More particularly, in connection with hydraulic cylinders, significant space must be made available so as to accommodate the hydraulic cylinder pistons. Sometimes, excavations for accommodating the hydraulic cylinder pistons are not feasible due to the presence of water tables beneath the ground.

OVERALL OBJECTIVES OF THE INVENTION

Figure 4:
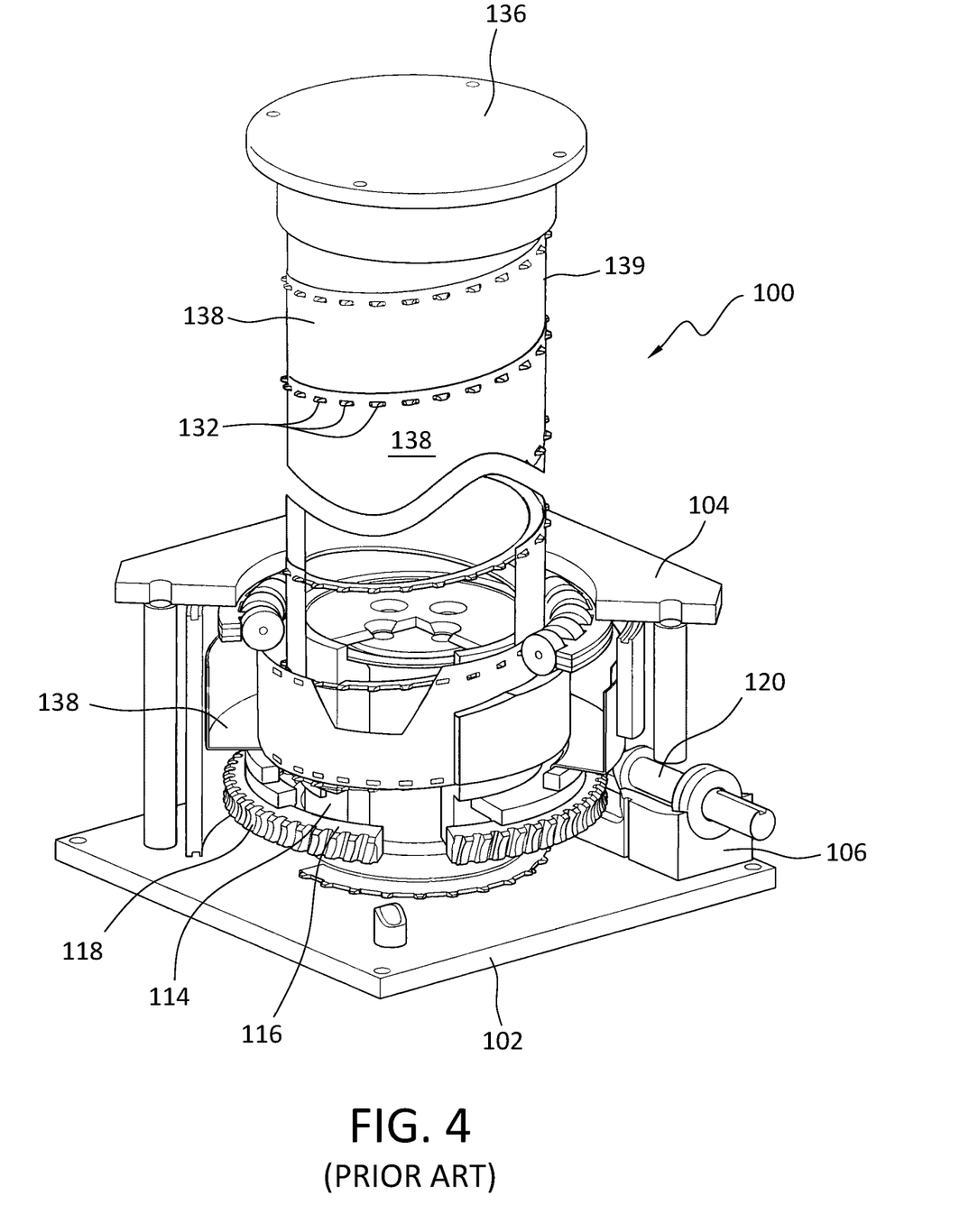
FIG. 4 is a perspective view of the helical band actuator of LaForest, as disclosed within corresponding FIG. 3 of the LaForest patent, showing the helical band actuator in an extended state.

The first helical band actuator (HBA) was patented by Gagnon et al. for which they received U.S. Pat. No. 4,875,660 which issued on Oct. 24, 1989. An improvement patent, U.S. Pat. No. 7,213,796, was issued to LaForest on May 8, 2007. As can best be seen and appreciated from FIGS. 1-5, which correspond to particular drawing figures of the LaForest patent and labelled PRIOR ART for background purposes, it is briefly noted that the helical band actuator (HBA) system of LaForest is generally indicated by the reference character 100 and is seen to comprise a base 102 and a wheel support plate 104. A drive shaft casing 106 is fixedly mounted upon the base 102, and an annular frame 108 is fixedly secured to both the base 102 and the wheel support plate 104. An upstanding hub 110 is mounted upon the base 102 and is defined around a vertical axis 112. A rotor 114 is rotatably mounted upon the base 102 and is adapted to rotate around the upstanding hub 110 and the vertical axis 112. An annular flange 116 projects radially outwardly from a lower end portion of the rotor 114, and it is seen that the annular flange 116 is provided with a plurality of gear teeth 118, as can best be seen in FIGS. 2 and 4, which are adapted to engage a rotary threaded drive shaft 120 that is driven by means of a suitable rotary power source, not shown, wherein the rotary threaded drive shaft 120 is rotatably mounted within the drive shaft casing 106.

Continuing further, in accordance with the operative principles of helical band actuator systems, it is seen that the helical band actuator system 100 comprises a first elongated fastening band 122 which is annularly wrapped around the base of the rotor 114 so as to be disposed and supported upon the base 102, and wherein a proximal end of the first elongated fastening band 122 is fixedly secured to the base 102. In addition, this first elongated fastening band 122 is capable of being extended or retracted in a spiral fashion around the longitudinal axis 112 as a result of a portion 124 of the first elongated fastening band 122 being disposed within the upper end of a spiral groove 126 defined within the outer peripheral surface of the rotor 114 while additional intermediate portions of the first elongated fastening band 122 are disposed within corresponding intermediate portions of the spiral groove 126 as at 128, 130, after the first elongated fastening band 122 has been inserted through an opening, not shown, defined within the geared flange 116 of the rotor 114. In addition, it is noted that the outer edge portion of the first elongated fastening band 122 is provided with a serial array of radially outwardly projecting teeth 132, which extend along its entire longitudinal extent, for a purpose to be disclosed shortly hereinafter, and which can best be seen in FIGS. 2 and 5. It is to be understood that when the first elongated fastening band 122 is disposed within the spiral grooves 126, 128, 130 with the radially outwardly projecting teeth 132 always projecting radially outwardly from the spiral grooves 126, 128, 130, the first elongated fastening band 122 is freely movable along its longitudinal length within the spiral grooves 126, 128, 130 and with respect to the rotor 114 such that as the rotor 114 rotates, the first elongated fastening band 122 does not rotate therewith but is simply elevated as the rotor 114 rotates. Still further, the distal end 134 of the first elongated fastening band 122 projects above the upper end of the rotor 114 so as to be fixedly attached to an undersurface portion of a load-bearing platform 136 as can best be seen in FIGS. 1 and 3, wherein the load-bearing platform 136 is of course movable upwardly and downwardly relative to, for example, the base 102 of the helical band actuator 100, as will be described more fully hereinafter, so as to, in turn, elevate or lower a particular load carried by the load-bearing platform 136.

Still further, and in accordance with the operative principles of helical band actuator systems, it is seen that the helical band actuator system 100 also comprises a second elongated flat structural band 138 which is annularly wrapped in vertically oriented layers that are disposed parallel to the longitudinal axis 112 of the helical band actuator system 100 when the second elongated flat structural band 138 is disposed at its retracted position. As will become better understood hereinafter, as the second elongated flat structural band 138 is unwound and extended, the layers of the second elongated flat structural band 138 will effectively define a structural helix which, together with the first elongated fastening band 122, will form a telescopically extendable and retractable structure, having the form of a substantially cylindrical, vertically oriented telescopic column 139, for supporting the load-bearing platform 136. More particularly, the second elongated flat structural band 138 is disposed within an annular magazine 140 which is mounted upon an annular mounting bracket 142 which is movably mounted upon the rotor 114 so as to move with respect to the rotor 114 as the supply of the second elongated flat structural band 138 is successively depleted, the radially outermost layer of the second elongated flat structural band 138 being fixedly secured within the annular magazine 140.

Figure 2:
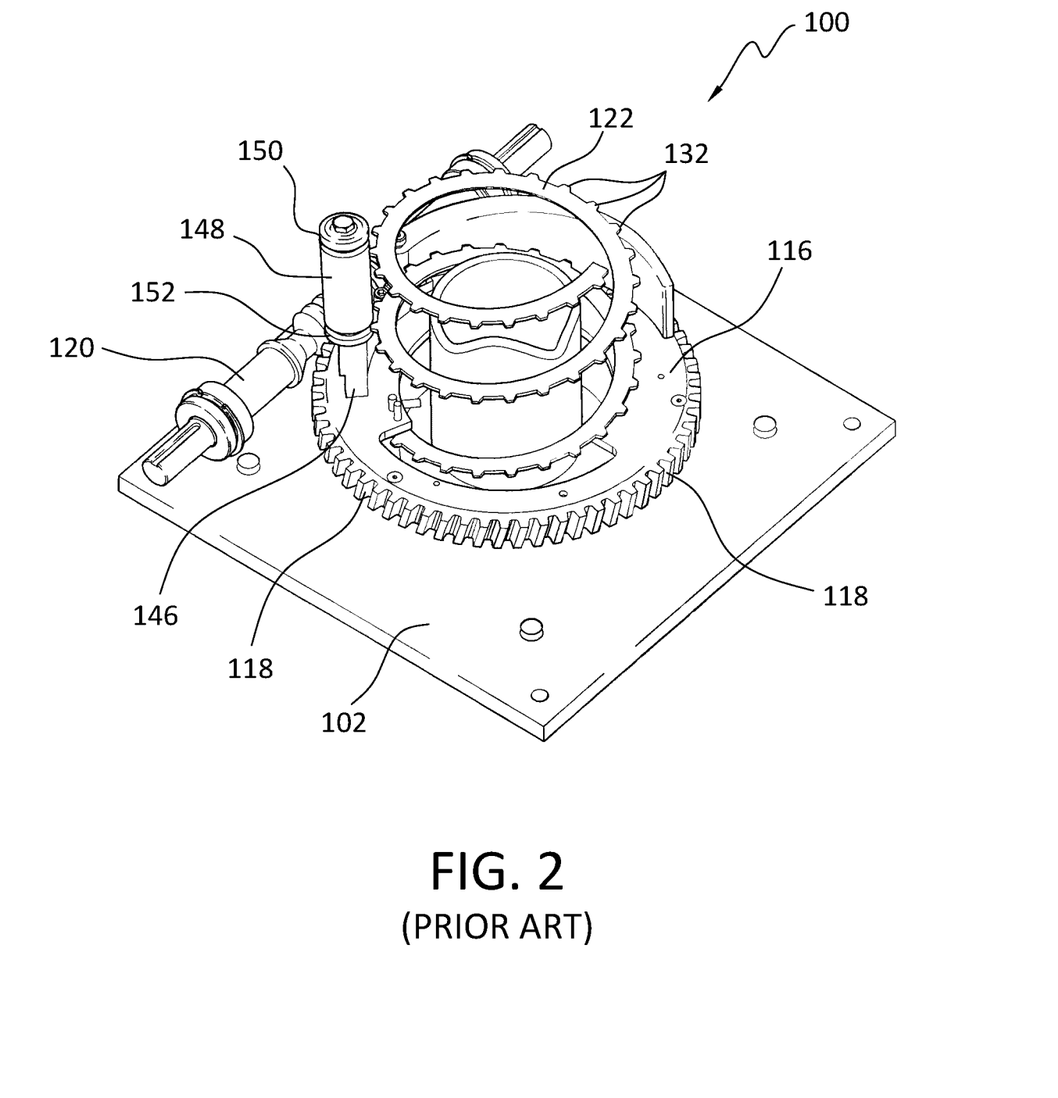
FIG. 2 is a perspective view of a portion of the helical band actuator of LaForest, as disclosed within corresponding FIG. 6 of the LaForest patent, showing how the first elongated fastening band begins to extend as the rotor is rotated.
Figure 3:
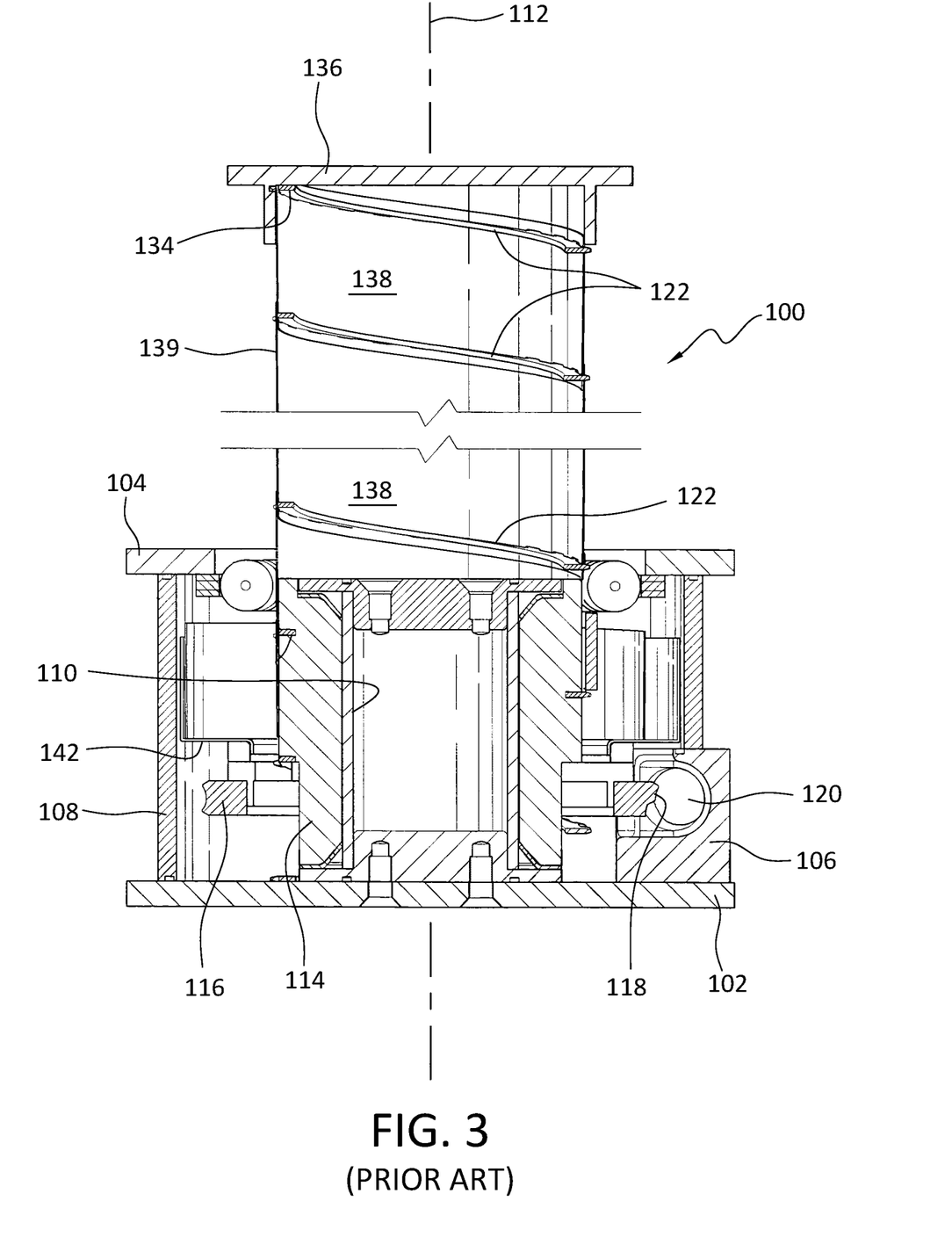
FIG. 3 is a cross-sectional view of the helical band actuator of LaForest, as disclosed within corresponding FIG. 5 of the LaForest patent, showing the helical band actuator in an extended state.
Figure 5:
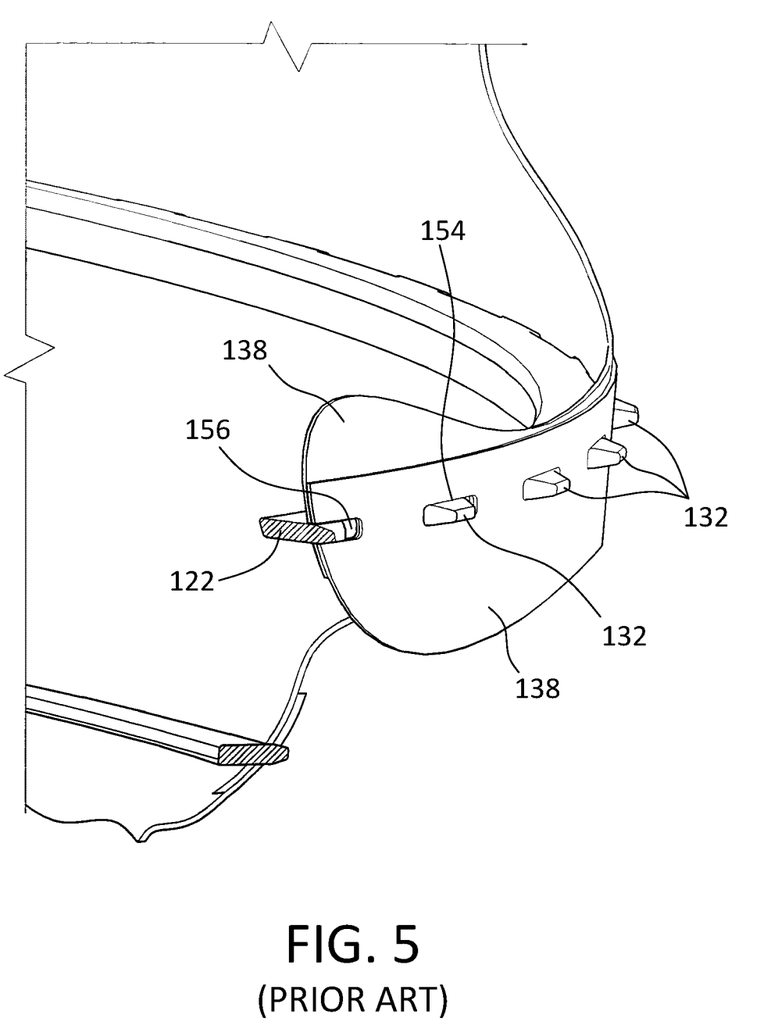
FIG. 5 is a perspective view of the helical band actuator of LaForest, as disclosed within corresponding FIG. 8 of the LaForest patent, disclosing the interlocking of upper and lower coils or spirals of the second elongated flat structural band of the helical band actuator by means of the radially outwardly projecting teeth of the first elongated fastening band.
Figure 6:
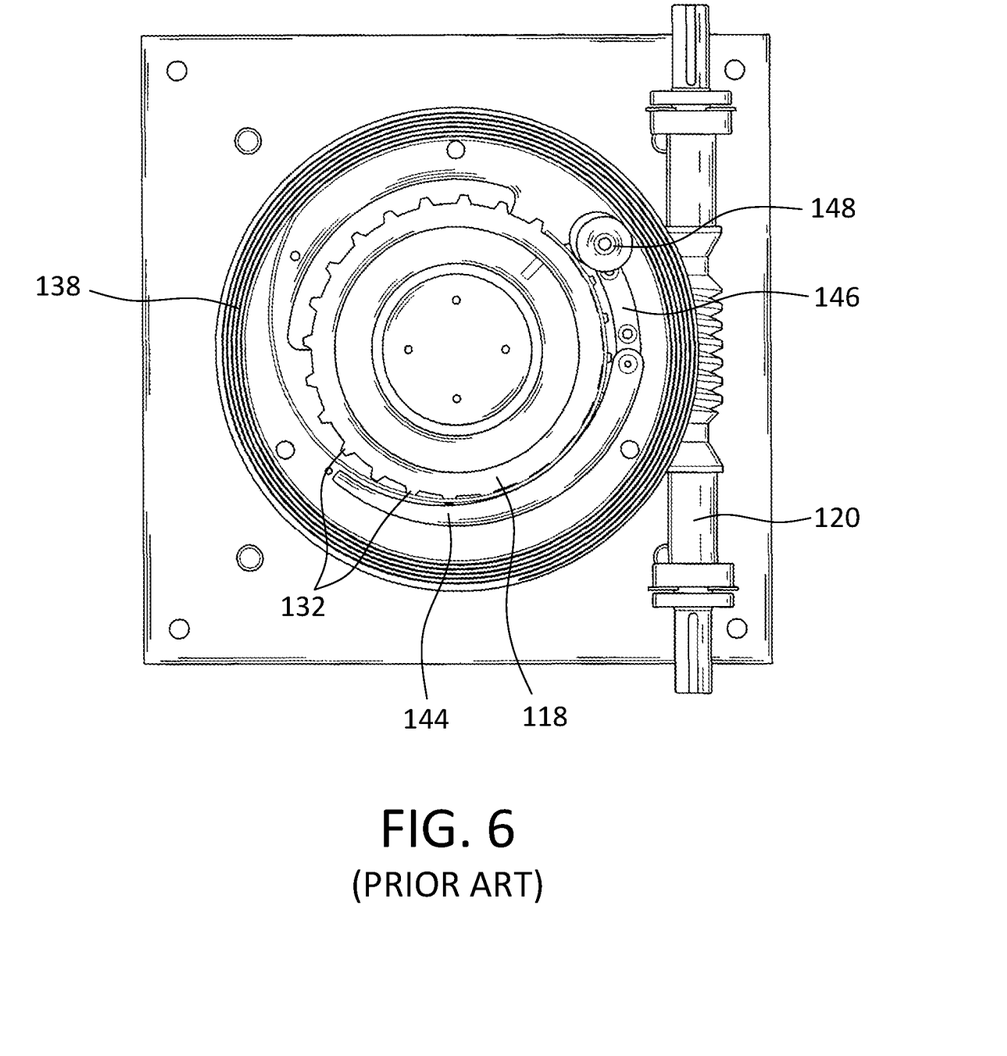
FIG. 6 is a partial top plan view of the helical band actuator of LaForest, as disclosed within corresponding FIG. 7 of the LaForest patent, showing how the coils of the second elongated flat structural band are moved into contact with the first elongated fastening band such that the teeth of the first elongated fastening band can lock the first elongated fastening band and the second elongated structural band together.

The radially innermost layer of the second elongated flat structural band 138 is guided radially inwardly, so as to be interposed between successive spirals of the first elongated fastening band 122 as the first elongated fastening band 122 is being extended as a result of the rotation of the rotor 114 so as to thereby form the vertically oriented telescopic column 139, by means of a spring-loaded pivotally mounted guide arm 144, as can best be seen in FIG. 6. The guide arm 144 is pivotally mounted upon an arcuately shaped, upstanding guide arm support block 146 which is fixedly mounted atop the radially outwardly extending flange portion 116 of the rotor 114, as can best be seen in FIGS. 2 and 6, while an upstanding roller 148 is mounted atop the arcuately shaped, upstanding guide arm support block 146. As best seen in FIG. 2, the upstanding roller 148 is provided with upper and lower annular grooves 150, 152 within which the radially outwardly protruding teeth 132 of successive, vertically spaced spiral portions of the first elongated fastening band 122 can be disposed. Lastly, as can best be seen and appreciated from FIGS. 4 and 5, upper and lower edge portions of the second elongated flat structural band 138 are provided with upper and lower longitudinally extending and longitudinally spaced arrays of apertures 154, 156 such that the radially outwardly protruding teeth 132 of the first elongated fastening band 122 can extend therethrough so as to effectively lock successive layers of the second elongated flat structural band 138 together so as to in fact form the upstanding cylindrical telescopic column 139.

Again, briefly, in operation, as the rotor 114 rotates, the first elongated fastening band 122 will be guided vertically upwardly as a result of being disposed within the helical grooves 126, 128, 130, wherein successive turns or coils of the first elongated fastening band 122 are vertically spaced apart. Simultaneously, the radially innermost coil or layer of the second elongated flat structural band 138 will be engaged by the spring-loaded pivotally mounted guide arm 144, and by upstanding roller 148, which rotate integrally with the rotor 114, so as to effectively guide each turn or coil of the second elongated flat structural band 138 radially inwardly between successive turns or coils of the first elongated fastening band 122 whereby the teeth 132 of the first elongated fastening band 122 will effectively be forced to penetrate the upper set of longitudinally extending holes or apertures 154 of the second elongated flat structural band 138.

During subsequent rotations of the rotor 114 and the subsequent axially upward movement of subsequent portions of the first elongated fastening band 122, as well as the radially inward movement of subsequent portions of the second elongated flat structural band 138, upper and lower edge portions of successive, vertically spaced sections of the second elongated flat structural band 138 will effectively be locked together by means of the radially outwardly projecting teeth 132 of the first elongated fastening band 122 projecting through the holes or apertures 154, 156 formed within the upper and lower edge portions of the second elongated flat structural band 138, as best seen in FIG. 5, such that the vertically extending telescopic column 139 will be formed so as to be capable of elevating the load-bearing platform 136. It is to be noted that the load of the vertically extending telescopic column 139 is sustained as a result of the upper and lower turns or spirals of the second band 138 being interconnected together by means of the first elongated fastening band 122, as well as by the rotor 114 and those portions of the first elongated fastening band 122 disposed within the spiral grooves 126, 128, 130 formed within the rotor 114. In addition, the interlocked first and second bands 122, 138 prevent collapse of the column 139. Lastly, in order to lower the vertically extending telescopic column 139 and the load-bearing platform 136, the rotor 114 is rotated in a reverse direction and the first and second elongated bands 122, 138 are separated from each other and returned to their original magazine or storage positions.

While the noted prior art describes satisfactory operative systems, and is utilized within various different industries, such as, for example, the automobile manufacturing industry wherein helical band actuators (HBAs) are utilized to raise and lower large and heavy robotic machinery operating along a production line, such as, for example, spot welders. However, in every case where the payload, which is to be raised or lowered by means of a helical band actuator (HBA), requires an external power source, external electrical power wires must be provided, and such external electrical power wires must be capable of moving along with the extension and retraction of the helical band actuator (HBA) as the helical band actuator (HBA) is raised and lowered. Other examples of the use of helical band actuators (HBAs) are in connection with the raising and lowering of particular loads utilized within the field of vehicle-mounted security cameras and satellite communication antennas which have various or different electrically-powered, remote-controlled payloads mounted vertically extendable and retractable masts. Often, these systems require both electrical power wires as well as fiber-optic cables which are of course used for long-distance, high-performance data networking and telecommunications. The challenge with existing, conventional, prior art helical band actuators (HBAs), such as those disclosed within the aforenoted Gagnon et al. and LaForest patents, is that no structural provision has been provided within such systems for routing and protecting such electrical power wires and fiber-optic cables. Accordingly, it is very easy for such wires and cables to become tangled, snagged upon other operating components, kinked, chafed, and/or broken, corroded, or eroded as a result of hundreds or even thousands of hours used to repeatedly extend and retract the helical band actuators (HBAs) throughout their service lives.

A need therefore exists in the art for a new and improved helical band actuator (HBA) which can be used to raise and lower a particular load mounted upon a load-bearing platform. An additional need exists in the art for a new and improved helical band actuator (HBA) which can be used to raise and lower a particular load mounted upon a load-bearing platform such that the new and improved helical band actuator (HBA) can resolve the aforenoted deficiencies of the known helical band actuators (HBAs). A further need exists in the art for a new and improved helical band actuator (HBA) which can be used to raise and lower a particular load mounted upon a load-bearing platform such that the new and improved helical band actuator (HBA) can resolve the aforenoted deficiencies of the known helical band actuators (HBAs) whereby electrical power wires and fiber-optic cables can be integrally incorporated within the helical band actuator (HBA). A yet further need exists in the art for a new and improved helical band actuator (HBA) which can be used to raise and lower a particular load mounted upon a load-bearing platform such that the new and improved helical band actuator (HBA) can resolve the aforenoted deficiencies of the known helical band actuators (HBAs) whereby electrical power wires and fiber-optic cables can be integrally incorporated within the helical band actuator (HBA) and can therefore be capable of being connected to the particular load mounted upon the load-bearing platform.

A still further need exists in the art for a new and improved helical band actuator (HBA) which can be used to raise and lower a particular load mounted upon a load-bearing platform such that the new and improved helical band actuator (HBA) can resolve the aforenoted deficiencies of the known helical band actuators (HBAs) whereby electrical power wires and fiber-optic cables can be integrally incorporated within the helical band actuator (HBA) and can therefore be connected a particular load mounted upon the load-bearing platform whereby electrical power, data transmission, computer-control signals, and other telecommunication signals can in fact be provided to the particular load being borne upon the load-bearing platform. A last need exists in the art for a new and improved helical band actuator (HBA) which can be used to raise and lower a particular load mounted upon a load-bearing platform such that the new and improved helical band actuator (HBA) can resolve the aforenoted deficiencies of the known helical band actuators (HBAs) whereby electrical power wires and fiber-optic cables can be integrally incorporated within the helical band actuator (HBA) and can therefore be connected a particular load mounted upon the load-bearing platform whereby electrical power, data transmission, computer-control signals, and other telecommunication signals can in fact be provided to the particular load being borne upon the load-bearing platform, and wherein the electrical power wires and fiber-optic cables are enclosed within a sealed compartment such that as the helical band actuator is operated, both in its upward and downward elevating and lowering modes of operation, the electrical power wires and fiber optic cables cannot become tangled, snagged upon other operating components, kinked, chafed, and/or broken, corroded, or eroded as a result of hundreds or even thousands of hours used to repeatedly extend and retract the helical band actuator (HBA) throughout the service life of the helical band actuator (HBA).

SUMMARY OF THE INVENTION

An overall objective of the present invention is to provide a new and improved helical band actuator (HBA) which can be used to raise and lower a particular load mounted upon a load-bearing platform. An additional overall objective of the present invention is to provide a new and improved helical band actuator (HBA) which can be used to raise and lower a particular load mounted upon a load-bearing platform such that the new and improved helical band actuator (HBA) can resolve the aforenoted deficiencies of the known helical band actuators (HBAs). A further overall objective of the present invention is to provide a new and improved helical band actuator (HBA) which can be used to raise and lower a particular load mounted upon a load-bearing platform such that the new and improved helical band actuator (HBA) can resolve the aforenoted deficiencies of the known helical band actuators (HBAs) whereby electrical power wires and fiber-optic cables can be integrally incorporated within the helical band actuator (HBA). A yet further overall objective of the present invention is to provide a new and improved helical band actuator (HBA) which can be used to raise and lower a particular load mounted upon a load-bearing platform such that the new and improved helical band actuator (HBA) can resolve the aforenoted deficiencies of the known helical band actuators (HBAs) whereby electrical power wires and fiber-optic cables can be integrally incorporated within the helical band actuator (HBA) and can therefore be capable of being connected to the particular load mounted upon the load-bearing platform.

A still further overall objective of the present invention is to provide a new and improved helical band actuator (HBA) which can be used to raise and lower a particular load mounted upon a load-bearing platform such that the new and improved helical band actuator (HBA) can resolve the aforenoted deficiencies of the known helical band actuators (HBAs) whereby electrical power wires and fiber-optic cables can be integrally incorporated within the helical band actuator (HBA) and can therefore be connected a particular load mounted upon the load-bearing platform whereby electrical power, data transmission, computer-control signals, and other telecommunication signals can in fact be provided to the particular load being borne upon the load-bearing platform. A last overall objective of the present invention is to provide a new and improved helical band actuator (HBA) which can be used to raise and lower a particular load mounted upon a load-bearing platform such that the new and improved helical band actuator (HBA) can resolve the aforenoted deficiencies of the known helical band actuators (HBAs) whereby electrical power wires and fiber-optic cables can be integrally incorporated within the helical band actuator (HBA) and can therefore be connected a particular load mounted upon the load-bearing platform whereby electrical power, data transmission, computer-control signals, and other telecommunication signals can in fact be provided to the particular load being borne upon the load-bearing platform, and wherein the electrical power wires and fiber-optic cables are enclosed within a sealed compartment such that as the helical band actuator is operated, both in its upward and downward elevating and lowering modes of operation, the electrical power wires and fiber optic cables cannot become tangled, snagged upon other operating components, kinked, chafed, and/or broken, corroded, or eroded as a result of hundreds or even thousands of hours used to repeatedly extend and retract the helical band actuator (HBA) throughout their service life of the helical band actuator (HBA).

The foregoing and other objectives of the present invention are achieved by integrally forming a sealed electrical power wire and cable conduit upon the radially inner edge portion of the first elongated fastening band such that the sealed electrical power wire and fiber optic cable conduit has the same thickness dimensions as that of the first elongated fastening band and will of course extend throughout the longitudinal extent of the first elongated fastening band which, as has been shown, extends from its first end fixedly secured to the base of the helical band actuator (HBA) to its second opposite end fixedly secured to the load-bearing platform movably mounted atop the helical band actuator (HBA). A first suitable hole or aperture is formed within the base of the helical band actuator (HBA) so as to permit the electrical power wire and the fiber optic cable to be inserted therethrough and routed into the lower or proximal end of the first elongated fastening band which is fixedly secured to the base of the helical band actuator (HBA). After being routed through the entire longitudinal extent of the first elongated fastening band of the helical band actuator (HBA), the electrical power wire and fiber optic cable will emerge from the second opposite end of the first elongated fastening band which is fixedly attached to the load-bearing platform, and routed through a second suitable hole or aperture formed within the load-bearing platform, such that the electrical power wire and the fiber optic cable can then be operatively connected to the load borne upon the load-bearing platform. In this manner, it is quite apparent that the electrical power wire and the fiber optic cable will be entirely protected against any external hazards, such as, for example, becoming entangled with other components of the helical band actuator, or become snagged upon other operating components, or risk being kinked, chafed, and/or broken, corroded, or eroded as a result of hundreds or even thousands of hours used to repeatedly extend and retract the helical band actuator (HBA) throughout the service life of the helical band actuator (HBA). It is lastly to be noted that as a result of the use of the helical band actuator (HBA), and the provision of electrical power and fiber-optic capabilities to the load being borne by the load-bearing platform, significantly enhanced manufacturing or other operating capabilities are able to be achieved. For example, if the particular load being borne by means of the load-bearing platform was a multi-axis robotic arm, the robotic arm can only perform useful work within a predeterminedly defined volume of work circumscribed by means of the farthest reach of the robotic arm as measured from the base upon which the robotic arm is mounted. However, with the new and improved helical band actuator of the present invention, the volume within useful work to be performed by means of the robotic arm can be increased to twenty (20) times that which can be conventionally achieved.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
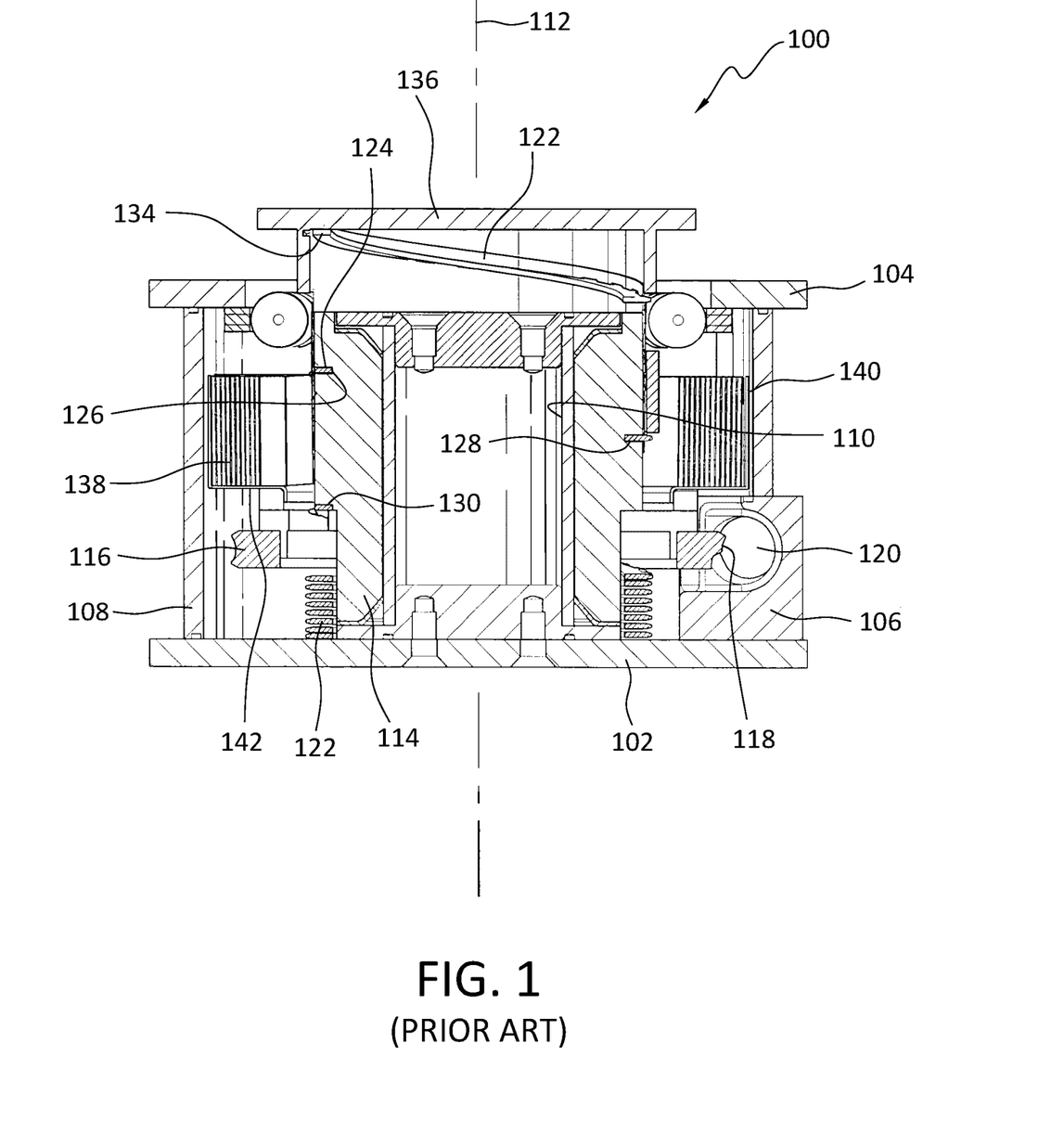
FIG. 1 is a cross-sectional view of the helical band actuator of LaForest, as disclosed within corresponding FIG. 4 of the LaForest patent, showing the helical band actuator in a collapsed or lowered state.
Figure 7:
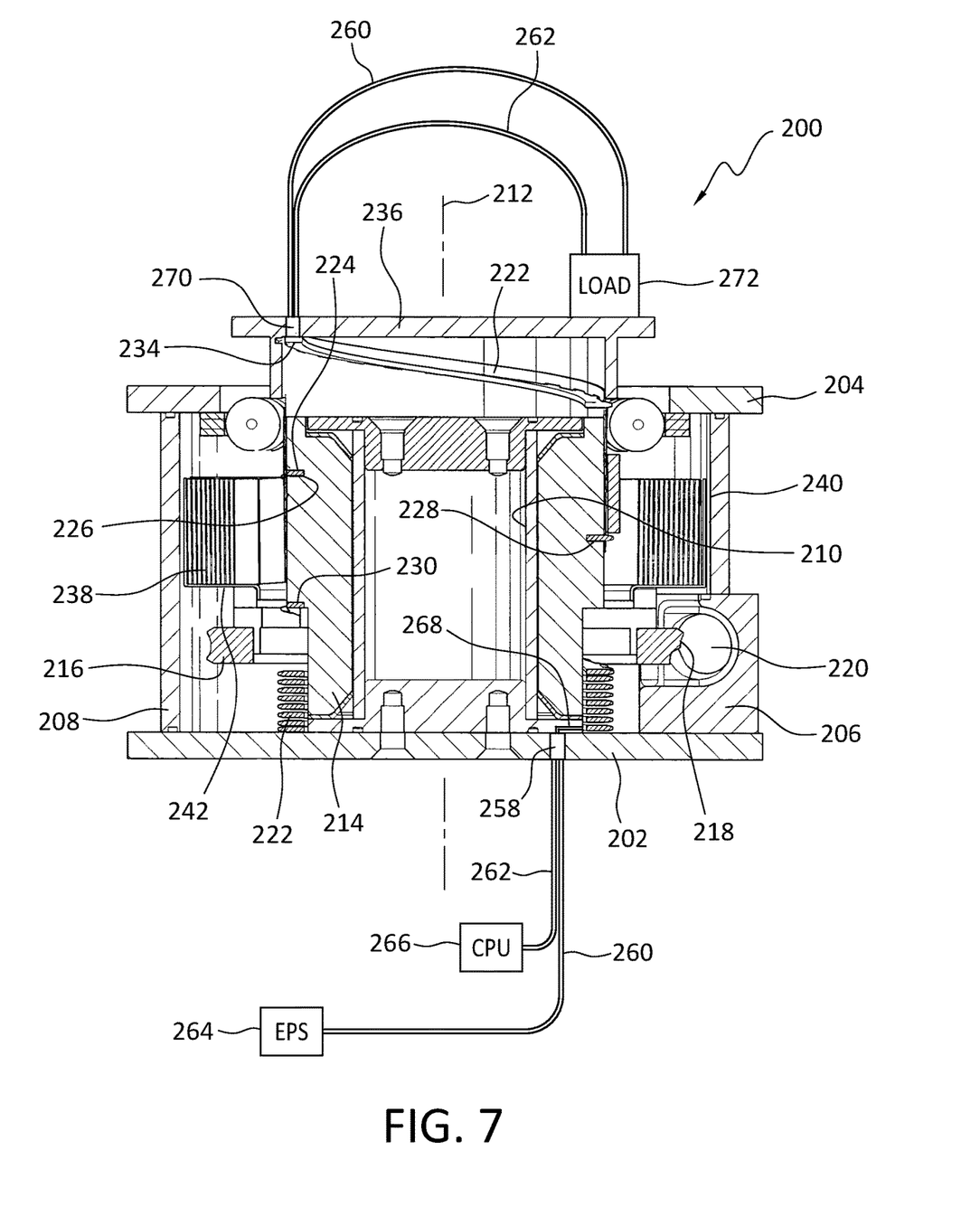
FIG. 7 is a cross-sectional view of a helical band actuator constructed in accordance with the principles and teachings of the present invention wherein it is illustrated how electrical power wires and fiber optic cables would be routed into the base of the helical band actuator, connected to the lowermost coil of the first elongated fastening band, routed through the entire longitudinal extent of the elongated fastening band, and exit from the load-bearing platform so as to be connected to a load borne by the load-bearing platform and thereby provide electrical power from a suitable electrical power source (EPS) to the load as well as computer-control signals to the load as transmitted by a central processing unit (CPU)

With reference now being made to FIG. 7, it is seen that the structure of the new and improved helical band actuator of the present invention is similar to the helical band actuator 100 disclosed in FIG. 1, however, the new and improved helical band actuator of the present invention has been designated by the reference character 200 and component parts of the helical band actuator 200, which correspond to similar component parts of the helical band actuator 100, have been designated by corresponding reference numbers except that they are within the 200 series. More particularly, in accordance with the principles and teachings of the present invention, a first hole or aperture 258 is defined within the base 202 of the helical band actuator 200 such that a first end of an electrical power wire 260 and a first end of a fiber optic cable 262 are able to be inserted through the first hole or aperture 258 so as to be respectively inserted into the lowermost coil of the first elongated fastening band 222 as shown schematically at 268. Second opposite ends of the electrical power wire 260 and the fiber optic cable 262 are respectively connected to an electrical power source (EPS) 264 and a central processing unit (CPU) 266 such that the electrical power wire 260 and the fiber optic cable 262 respectively carry electrical power and computer-control signals from the electrical power source (EPS) 264 and the central processing unit (CPU) 266.

Continuing further, and as will be more clearly illustrated and described shortly hereinafter, the first ends of the electrical power wire 260 and the fiber optic cable 262 are adapted to be inserted into the first, lowermost coil of the first elongated fastening band 222 and conducted through the entire longitudinal extent of the first elongated fastening band 222 such that the first ends of the electrical power wire 260 and the fiber optic cable 262 will exit from the distal end 234 of the first elongated fastening band 222 and will project through a second hole or aperture 270 defined within the load-bearing platform 236 so as to be operatively to a LOAD 272 fixedly mounted upon the load-bearing platform 236. In this manner, it can be readily appreciated the electrical power and computer-control signals, respectively generated by the electrical power source (EPS) 264 and the central processing unit (CPU) 266, can be readily transmitted to the LOAD 272 fixedly supported upon the load-bearing platform 236.

Figure 8:
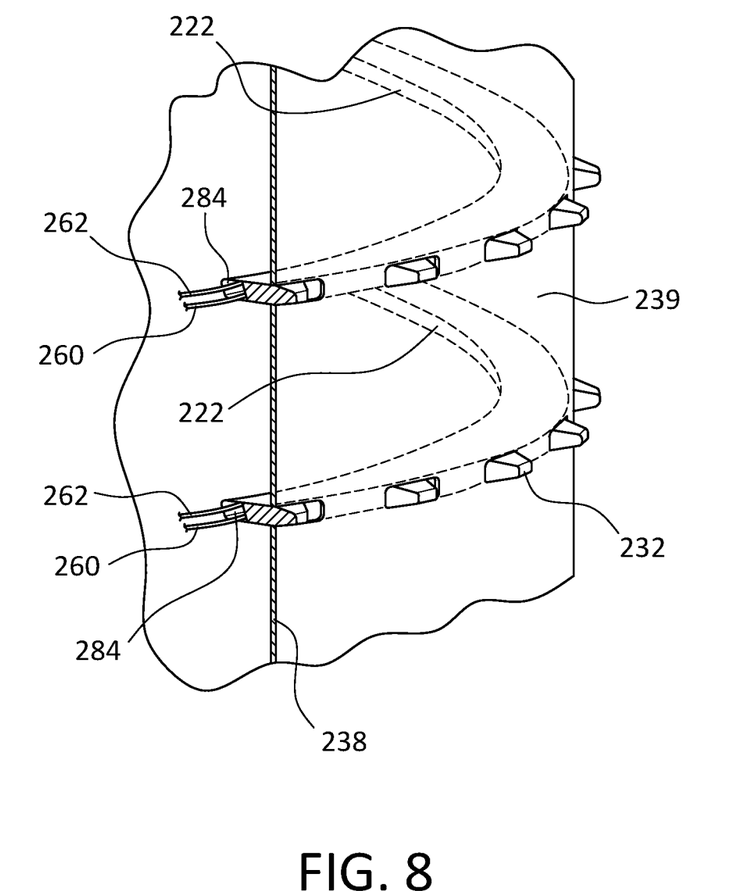
FIG. 8 is an enlarged, schematic, cross-sectional view of the first elongated fastening band showing how the sealed electrical power wire and cable conduit extending along the entire radially inner edge portion of the first elongated fastening band so as to house the electrical power wires and fiber optic cables which are to be operatively connected to the load borne by the load-bearing platform and thereby provide electrical power from the electrical power source (EPS) to the load as well as the computer-control signals to the load as transmitted from a central processing unit (CPU), is formed upon successive spiral coils of the first elongated fastening band.

With reference lastly being made to FIG. 8, there is illustrated an enlarged, schematic, cross-sectional view of the first elongated fastening band 222 showing how a sealed electrical power wire and cable conduit 284, extending along the entire radially inner edge portion 224 of the first elongated fastening band 222, and having the same thickness dimensions as the first elongated fastening band 22, is formed upon successive spiral coils of the first elongated fastening band 222 so as to house the electrical power wire 260 and the fiber optic cable 262 which are to be operatively connected to the LOAD 272 borne by the load-bearing platform 236 and thereby respectively provide electrical power from the electrical power source (EPS) 264, as well as computer-control signals, from the central processing unit (CPU) 266, to the LOAD 272. More particularly, the sealed electrical power wire and cable conduit 284 may comprise an original three-sided conduit integrally connected to, or defined within the leftmost side portion 224 of the first elongated fastening band 222 such that the sealed electrical power wire and cable conduit 284 is uncovered and open along such leftmost edge portion 224 of the first elongated fastening band 222 so as to permit the electrical power wire 260 and the fiber optic cable 262 to be inserted into the three-sided conduit. Subsequently, a cover plate may be fixedly attached to the fourth open side of the three-sided conduit so as to define the sealed electrical power wire and cable conduit 284.

Accordingly, it can be appreciated further that the electrical power wire 260 and the fiber optic cable 262 are now wholly contained within a longitudinally extending, radially innermost section of the first elongated fastening band 222 such that the electrical power wire 260 and the fiber optic cable 262 will move with the first elongated fastening band 222 as the first elongated fastening band 222 moves along the spiral groove 226, 228, 230 defined within the rotor 214 when the rotor 214 is rotated. In this manner, the electrical power wire 260 and the fiber optic cable 262 are fully protected from any external forces which may otherwise cause the electrical power wire 260 and the fiber optic cable 262 to become entangled, snagged, bent, kinked, chafed, corroded, eroded, and the like, as the first elongated fastening band 222 moves through the rotor 214 and is operatively connected to the second elongated flat structural band 238 such that the vertically extending telescopic column 239 can be erected and vertically extended so as to elevate the load-bearing platform 236 carrying the LOAD 272. Accordingly, the service lives of the electrical power wire 260 and the fiber optic cable 262 are significantly improved. Still further, it is to also be noted that as a result of the use of the helical band actuator (HBA) 200, and the provision of electrical power and fiber-optic capabilities to the LOAD 272 being borne by the load-bearing platform 236, significantly enhanced manufacturing or other operating capabilities are able to be achieved. For example, if the particular LOAD 272 being borne by means of the load-bearing platform 236 was a multi-axis robotic arm, the robotic arm can only perform useful work within a predeterminedly defined volume of work circumscribed by means of the farthest reach of the robotic arm as measured from the base upon which the robotic arm is mounted. However, with the new and improved helical band actuator 200 of the present invention, the volume within useful work to be performed by means of the robotic arm can be increased to twenty (20) times that which can be conventionally achieved.

Obviously, many variations and modifications of the present invention are possible in light of the above teachings. It is therefore to be understood that within the scope of the appended claims, the present invention may be practiced otherwise than as specifically described herein.

What is claimed is claimed as new and desired to be protected by means of Letters Patent, is:

1. A helical band actuator forming a vertically oriented telescopic column for supporting a load-bearing platform, comprising:
    a base;
    said load-bearing platform disposed above said base, adapted to be movably mounted upwardly and downwardly with respect to said base, and having a load fixedly mounted thereon;
    a rotor rotatably mounted upon said base around a vertically oriented axis and having a spiral groove defined within an outer peripheral surface portion of said rotor which extends from a first lower end of said rotor to a second upper end of said rotor, and wherein said spiral groove extends radially inwardly from said outer peripheral surface portion of said rotor to said oriented axis;
    a first elongated fastening band coiled around said rotor, supported upon said base, movably disposed within said spiral groove defined within said outer peripheral surface portion of said rotor, and having a first end thereof fixedly connected to said base and a second opposite end thereof fixedly connected to said load-bearing platform;
    a second elongated flat structural band coiled around said rotor and adapted to be connected to said first elongated fastening band as said rotor is rotated such that together, said first elongated fastening band and second elongated flat structural band will define said vertically oriented telescopic column for supporting said load-bearing platform and said load disposed upon said load-bearing platform; and
    a closed conduit, defined upon radially inward edge portions of said first elongated fastening band and extending throughout the length of said first elongated fastening band as defined between said first end thereof fixedly connected to said base and said second opposite end fixedly connected to said load-bearing platform, for accommodating at least one electrical power wire, operatively connected to an electrical power source (EPS), and
    at least one fiber optic cable operatively connected to a central processing unit (CPU), such that electrical power and computer-control signals can be transmitted from said electrical power source (EPS) and said central processing unit (CPU) to said load fixedly mounted upon said load-bearing platform.

2. The helical band actuator as set forth in claim 1, wherein:
    radially outer peripheral edge portions of said first elongated fastening band are provided with a series of radially outwardly projecting teeth; and
    said second elongated flat structural band is provided with a series of holes or apertures within upper and lower edge portions,
    whereby when said rotor is rotated, said first elongated fastening band will define vertically spaced, substantially horizontally extending portions of a first spiral, while said second elongated flat structural band will define vertically spaced, substantially vertically oriented portions of a second spiral such that said series of radially outwardly projecting teeth of said first elongated fastening band will extend through said series of holes or apertures defined within said upper and lower edge portions of said second elongated flat structural band so as to fixedly secure said vertically spaced, substantially vertically oriented portions of said second elongated flat structural band together, thereby defining said vertically oriented telescopic column for supporting said load-bearing platform and said load fixedly mounted upon said load-bearing platform.

3. The helical band actuator as set forth in claim 1, wherein:

said vertically oriented telescopic column has an expansion ratio of 20:1 as defined between the full extension of said vertically oriented telescopic column and the full retraction of said vertically oriented telescopic column.

4. The helical band actuator as set forth in claim 3, wherein:

said load disposed upon said load-bearing platform is configured to include a robotic arm.

5. The helical band actuator as set forth in claim 4, wherein:

as a result of said expansion ratio of said vertically oriented telescopic column, a volume within which said robotic arm is capable of working is twenty (20) times that within which said robotic arm would be capable of working if not mounted upon said vertically oriented telescopic column.

* * * * *